April 26, 1927.
C. A. BRIGGS
SAW TOOTH GAUGE
Filed April 17, 1926
1,626,029
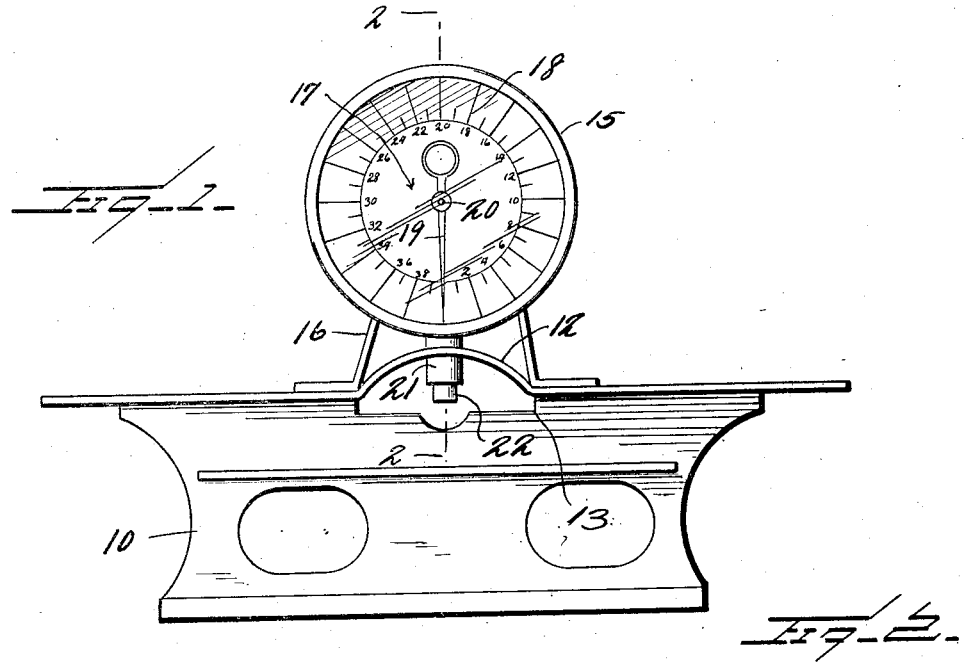
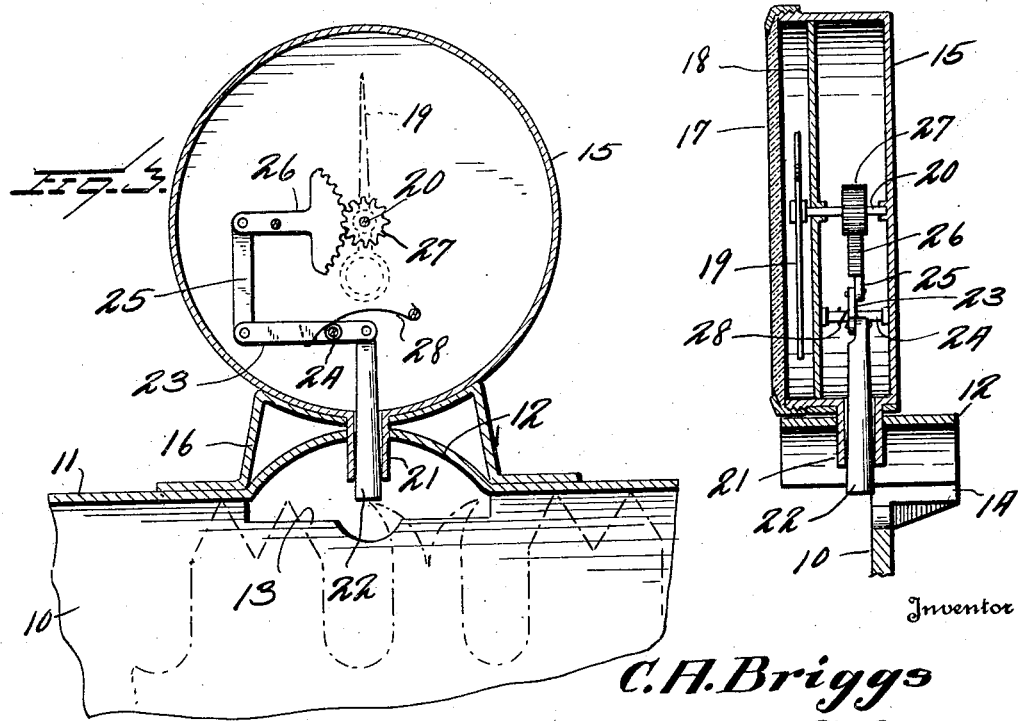
Inventor
C. A. Briggs
By Watson E. Coleman
Attorney Patented Apr. 26, 1927.

1,626,029

UNITED STATES PATENT OFFICE.

CLYDE A. BRIGGS, OF MILLWOOD, OREGON.

SAW TOOTH GAUGE.

Application filed April 17, 1926. Serial No. 102,736.

This invention relates to gauges for gauging the raker teeth of saws and the general object of the invention is to provide a raker gauge to be used in sharpening cross cut saws, which gauge will work on any kind of saw that has raker teeth, the gauge never needing any adjustment.

A further object is to provide a gauge which will indicate to what extent, if any, one of the raker teeth extends beyond another tooth.

A still further object is to provide a gauge of this character including a member adapted to be disposed flat upon the saw teeth and thus be on a level with the points on the saw teeth and provide a micrometer gauge which is mounted upon said member and which has a projecting actuator resiliently urged below the level or beyond the level of the inner face of said member and which is in the form of a dial having a hand operating over the dial, the dial being graduated so as to show a movement of .001 of an inch of the actuator.

Another object is to provide a gauge of this character which will do away with the necessity of the saw filer constantly having to note whether the point of the saw touches upon an adjustable stop, which is the case with the ordinary gauge, or whether he can see light between the extremity of the tooth and the adjustable stop to thereby determine whether or not he has correctly filed the saw tooth, my improved gauge on the other hand, permitting the saw filer to observe readily and quickly whether or not the tooth has been filed the correct amount.

My invention is illustrated in the accompanying drawings wherein:—

Figure 1 is a front elevation of a saw gauge constructed in accordance with my invention;

Fig. 2 is a section on the line 2—2 of Figure 1;

Fig. 3 is a vertical transverse section of the gauge, showing it in use.

Referring to these drawings 10 designates the stock of the gauge which may be of any suitable character and mounted upon one edge of this stock is a longitudinally extending plate 11, the central portion of which is curved upward or away from the stock, that portion of the stock immediately below this upwardly bowed portion 12 being cut away as at 13. Preferably the stock is annular or channel-shaped to provide a flange 14 upon which the plate 11 may rest and to which it may be attached in any suitable manner.

Mounted upon the upper face of the plate 11 is the cylindrical casing 15 of the micrometer. This cylindrical casing is supported by means of legs 16 which extend downward and outward and are attached in any suitable manner to the upper face of the plate 11. Thus, the casing 15 of the micrometer gauge is rigidly connected to the plate 11 and thus to the stock 10. The micrometer gauge has a transparent face 17 and disposed under this face is a dial 18 which preferably is graduated so as to indicate .001 of an inch. Operating over this dial is a pointer 19 carried upon an arbor 20. Extending through the supporting base for the case 15 and through the case itself and the upwardly bowed portion 12, is a sleeve 21 which acts as a guide and operating through this sleeve is a tapered pin or micrometer actuator 22. This pin is inwardly tapered and the inner end of this pin is pivotally connected to a lever 23 mounted upon a fulcrum 24. At its outer end this lever 23 is connected by a link 25 to the outwardly projecting arm of a sector gear 26, having teeth engaging with a pinion 27 mounted upon the arbor 20. Thus it will be seen that an inward movement of the pin 22 will shift the sector gear 26 which in turn will rotate the pinion 27 and rotate the hand or pointer over the dial. A spring 28 urges the lever 23 upward and thus forces the pin 22 outward through the sleeve 21. If now the plate 11 be applied against the edge face of a series of saw teeth with the pin 22 bearing against the end or apex of one of the teeth it will be obvious that the tooth will press the pin 22 inward to an amount equal to the distance which this tooth projects beyond the other teeth and that this will cause a rotation of the hand or pointer upon the dial and thus show to what extent the tooth, against which the pin 22 bears, projects beyond the other teeth. Preferably the dial is graduated with forty graduations, each graduation indicating .001 of an inch. Thus, if the tooth against which the pin 22 bears is less than the length of the adjacent tooth, this fact will be indicated on the dial. If the tooth against which the pin 22 bears has the same length as the adjacent tooth it will force the pin 22 inward and the pointer will register at zero. If this tooth, however, is .040 of an inch shorter than the other teeth, the pointer will also register at 40. Ordinarily, the pin 22 is projected .04 of an inch below the plate 11.

Any saw that is pulled by two men should have "lead" that is, the hind half of the raker tooth is swedged a little lower as, for instance, from .002 to .006 lower than the head half of the tooth and this can be easily done with my gauge. This gauge will permit all saws such as falling saws, bucking saws, and gas saws to be correctly filed. All the saw filer has to note is where the saws cut best in a particular kind of timber, then remember the particular point shown on the dial for the teeth of such saws, then the gauge is set straight down on the saw to be filed and the filer simply files on this tooth or half tooth until the pointer indicates that the correct reduction in length has been secured.

The pin 22 will never wear away as the gauge is set straight down on the saw and not shifted back and forth over the saw teeth as are other makes of gauges. It is this sliding action which dulls the teeth while the raker teeth are being swedged. The gauge is never adjusted by the filer but adjusted at the factory initially and thus the personal equation of the filer need never be considered as there is no room for any guess work or any calculation.

It will be understood that the raker tooth and the pin are "frozen", that is, the two are as one part. The filer merely watches the hand or pointer and there is no necessity of the filer bobbing up and down and straining his eyes while he is swedging the raker trying to see light between a gauge pin and the raker tooth .001 of an inch apart or less, which is the only way a raker gauge with a stationary pin can be used.

While I have illustrated a gauge having a dial graduated to indicate from .001 to .04 of an inch I do not wish to be limited to this as obviously the gauge might have a much finer adjustment or, in some cases, a coarser indication.

I claim:—

1. A saw tooth gauge comprising a member adapted to lie flat upon the edge faces of the saw teeth, and a micrometer including a dial means for rigidly mounting the micrometer upon said member, a pointer operating over the dial and an actuator therefor, a spring resiliently urging the actuator downward beyond the inner face of the member, and means operatively connecting the actuator to the pointer to cause its rotation around the dial in one direction as the actuator is moved inward.

2. A saw tooth gauge comprising a stock adapted to lie flat against the side of the saw and having a flange at right angles to the stock and adapted to lie flat upon the edge face of the saw teeth, the middle of said flange being elevated, and a micrometer rigidly mounted upon the flange and including a dial, a pointer operating thereover and an actuator therefor, the actuator extending through said flange and moving at right angles to the face of the flange, a spring resiliently urging the actuator downward beyond the inner face of the flange and being operatively connected to the pointer to cause its rotation around the dial in one direction as the actuator is moved inward.

In testimony whereof I hereunto affix my signature.

CLYDE A. BRIGGS.